(12) United States Patent
Lumbantobing et al.

(10) Patent No.: US 12,456,450 B1
(45) Date of Patent: Oct. 28, 2025

(54) TECHNIQUES FOR VOICE CONVERSION

(71) Applicant: Amazon Technologies, Inc., Seattle, WA (US)

(72) Inventors: Patrick Lumbantobing, Peterborough (GB); Viacheslav Klimkov, Berlin (DE); Vincent Laurent J. Pollet, Astene (BE)

(73) Assignee: Amazon Technologies, Inc., Seattle, WA (US)

( * ) Notice: Subject to any disclaimer, the term of this patent is extended or adjusted under 35 U.S.C. 154(b) by 412 days.

(21) Appl. No.: 18/076,178

(22) Filed: Dec. 6, 2022

(51) Int. Cl.
*G10L 15/26* (2006.01)
*G06F 40/58* (2020.01)
*G10L 13/02* (2013.01)

(52) U.S. Cl.
CPC .............. *G10L 13/02* (2013.01); *G06F 40/58* (2020.01); *G10L 15/26* (2013.01)

(58) Field of Classification Search
None
See application file for complete search history.

(56) References Cited

U.S. PATENT DOCUMENTS

| | | | | |
|---|---|---|---|---|
| 11,514,948 B1 * | 11/2022 | Nair | ..................... | G06F 16/2365 |
| 11,545,134 B1 * | 1/2023 | Federico | ............... | G10L 13/033 |
| 11,580,952 B2 * | 2/2023 | Zhang | ..................... | G10L 13/08 |
| 12,205,614 B1 * | 1/2025 | Sharma | .................... | G10L 25/30 |
| 2005/0180547 A1 * | 8/2005 | Pascovici | ................ | G10L 17/12 |
| | | | | 379/88.19 |
| 2006/0129399 A1 * | 6/2006 | Turk | ....................... | G10L 21/00 |
| | | | | 704/E21.001 |
| 2016/0005403 A1 * | 1/2016 | Agiomyrgiannakis | ...................... | |
| | | | | G10L 15/07 |
| | | | | 704/246 |
| 2017/0040017 A1 * | 2/2017 | Matthews | ............... | G10L 25/57 |
| 2019/0318722 A1 * | 10/2019 | Bromand | .............. | G10L 15/063 |
| 2022/0122591 A1 * | 4/2022 | Kameoka | ................ | G10L 15/22 |
| 2023/0298565 A1 * | 9/2023 | Rosenberg | .............. | G10L 15/22 |
| | | | | 704/235 |
| 2024/0161761 A1 * | 5/2024 | Islam | ..................... | H04N 19/20 |

* cited by examiner

*Primary Examiner* — Neeraj Sharma
(74) *Attorney, Agent, or Firm* — Kilpatrick Townsend & Stockton LLP

(57) ABSTRACT

Techniques implementable by a computer system are provided. The techniques include receiving a source speech waveform, the source speech waveform including one or more words spoken by a source speaker. The techniques also include generating source speaker characteristics associated with the source speaker based at least in part on the source speech waveform. The techniques also include receiving a target speaker selection, the target speaker selection associated with target speaker characteristics. The techniques also include generating a target speech waveform based at least in part on the target speaker characteristics, wherein the target speech waveform includes at least a portion of the one or more words.

20 Claims, 6 Drawing Sheets

TECHNIQUES FOR VOICE CONVERSION

BACKGROUND

Recording voices has become very common. Many types of media involve the recording of voices. The recording of spoken words and non-verbal components can be referred to as a speech waveform. Effects can be applied to speech waveforms to create certain distortions, however the distorted voices are just altered voices and can sound unnatural, and may intentionally sound unnatural. Similarly, text-to-speech can be used to generate speech waveforms. However, the speech waveforms are usually distinctly unnatural as computer-generated. These speech waveforms can have dissonant tone, style, and emotion.

BRIEF DESCRIPTION OF THE DRAWINGS

Various embodiments in accordance with the present disclosure will be described with reference to the drawings, in which.

DETAILED DESCRIPTION

Figure 1:
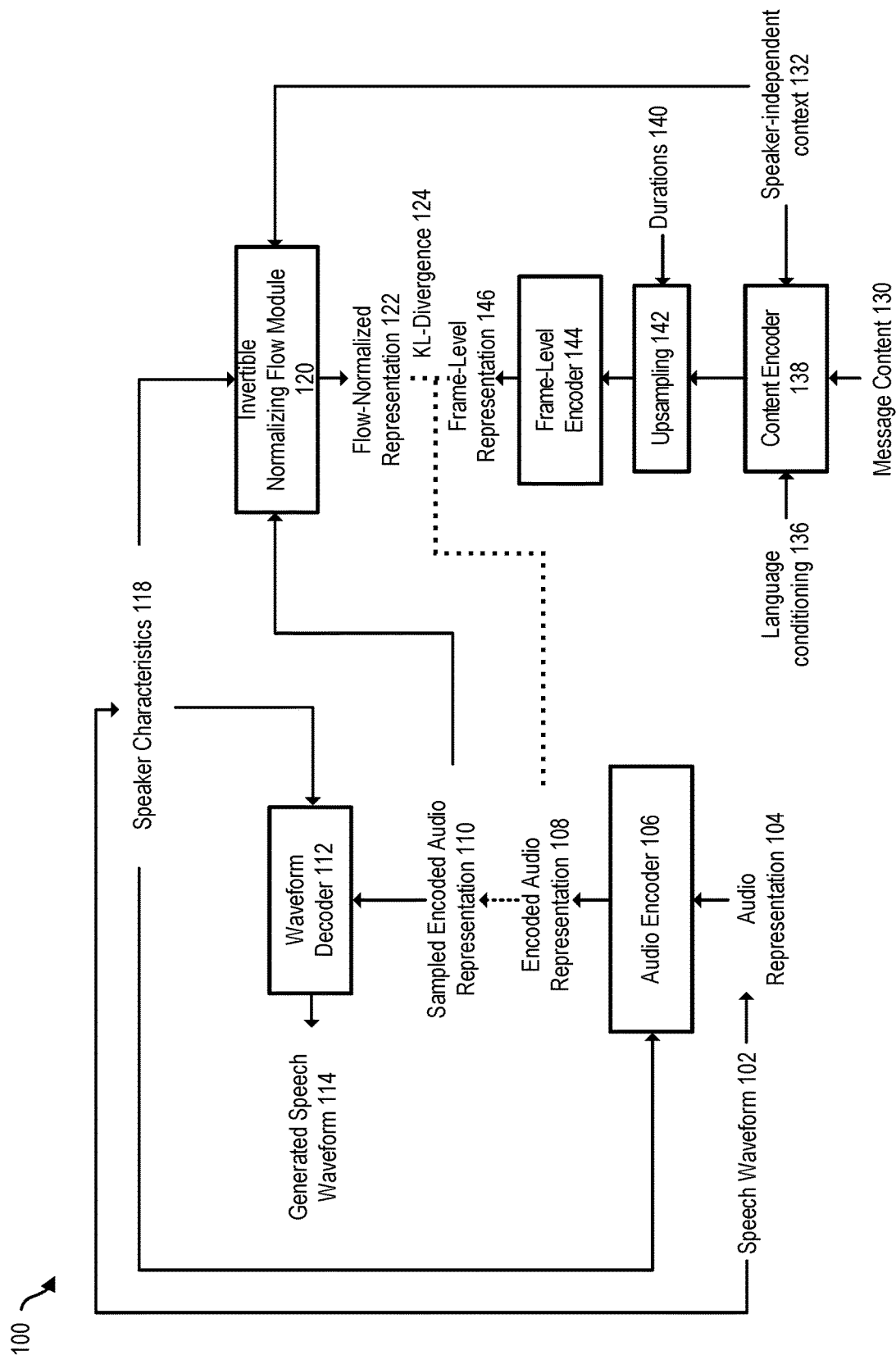
FIG. 1 illustrates an example system for training a voice conversion system, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This application describes techniques related to systems, methods, and non-transitory computer readable media for voice conversion. Voice conversion enables a user to provide a source speech waveform (for example, a speaker speaking words, phrases, or sentences) and output the same words and non-verbal components of the source speech waveform in a target voice. For example, a user can specify that the target voice is a famous actor, and then speak the phrase "The name's Bond, James Bond" as the source speech waveform. The output of the voice conversion would be the famous actor speaking "The name's Bond, James Bond" with the same non-verbal components as the user speaking the phrase.

The voice conversion techniques described herein can determine speaker characteristics associated with the source speaker. The source speaker characteristics can be extracted from the source speech waveform and be replaced with target speaker characteristics. This enables the target speech waveform to be a high-fidelity voice conversion. The speaker characteristics can include speaker conditioning, noise conditioning, and style conditioning. The speaker conditioning can isolate the frequencies at which the source speaker speaks. The noise conditioning can isolate ambient noise from the recording of the source speaker's voice. The style conditioning can isolate the tone and/or emotion of the source speaker. Style conditioning can include emotions such as excited, angry, sad, and the like.

The voice conversion techniques can extract the source speaker characteristics from the source speech waveform. By extracting the source speaker characteristics, the techniques described herein can isolate the flow of the noise information from the source speech waveform. This enables the techniques to create high-quality speech waveforms without unintentional ambient noise affecting the modeling of the voice characteristics. The techniques described herein can also replace the source speaker conditioning with the target speaker conditioning. This enables the techniques to create speech waveforms that sound like the target speaker. Similarly, the techniques described herein can determine the style conditioning of the source speech waveform to ascertain tone and/or emotion of the source speaker. The tone and/or emotion of the source speaker can be translated into an equivalent tone and/or emotion of the target speaker. This enables the techniques to create speech waveforms that sound life-like and match the emotion and tone of the source speech waveform. The created speech waveforms can also include non-verbal components of the input speech waveform such as pauses, inflections, silences, fluency of words, and the like.

The voice conversion techniques can also convert the source speech waveform into a target speech waveform in a language that the target speaker does not speak. For example, the system can be trained on a voice of a famous American actress who only speaks English, but a source speech waveform can be in Spanish. If the inputs to the voice conversion system are a Spanish source speech waveform and a selection of the famous American actress's voice, the output is a Spanish target speech waveform using the voice of the famous American actress. The voice conversion techniques can be used to determine speaker characteristics such as speaker conditioning, noise conditioning, and style conditioning as described herein and then apply those speaker characteristics to another speech waveform including a speech waveform of another language. This allows for cross-language voice conversion. Then the speaker conditioning can be applied to get the right voice of the actress and style conditioning could be applied to add tone and emotion to the voice conversion. Similarly, the noise conditioning could be applied to create the ambiance of the interview, for example if it was at a noisy premiere or in front of an audience.

FIG. 1 illustrates an example block diagram 100 of a training system for training the voice conversion system. The voice conversion system includes multiple machine learning systems that are trained by the training system. The machine learning systems that are trained can include the audio encoder 106, the waveform decoder 112, and the invertible normalizing flow module 120. The training system trains the audio encoder 106, the waveform decoder 112, and the invertible normalizing flow module 120 as described herein. The encoders and decoders described herein are machine learning systems, such as neural networks. The encoders convert inputs into representations that in themselves have no meaning until they are decoded by the decoders. In some implementations, the representations are sequences of vectors. In some implementations, the voice conversion system is an any-to-many voice conversion system such that the voice conversion system can convert any given voice into one or more (many) predefined voices. In some implementations, the voice conversion system is an any-to-any voice conversion system such that the voice conversion system can convert any given voice into a nearly limitless number of voices which can be combinations of predefined voices.

One of the inputs to the training system is a speech waveform 102 of one or more words. The one or more words can be a phrase, sentence, or set of sentences. The speech waveform 102 can be associated with a speaker. The speaker can be any kind of human, non-human, computer-generated, or other type of speaker. The waveform decoder 112 can be trained by comparing the speech waveform 102 with the generated speech waveform 114, where the generated speech waveform 114 is an output (or modified output) of the waveform decoder 112.

The speech waveform 102 can be used to generate an audio representation 104. An example audio representation 104 can be a linear spectrogram that indicates the frequencies of sound in the speech waveform 102 frame-by-frame. In some implementations, the audio representation 104 can be a lower resolution or lower fidelity than the speech waveform 102. For example, the speech waveform could be a lossless or nearly lossless digital representation of the one or more words spoken by the speaker. The corresponding audio representation could be a more lossy digital representation of the speech waveform by having, for example, a lower bitrate or fewer bits for resolution of frequencies. The audio representation can be divided into frames, where each frame represents the frequencies of sound and associated amplitudes in the speech waveform during a certain time duration. In some implementations, these frames can be 12 milliseconds long.

The speech waveform 102 can also be used to generate speaker characteristics 118. Speaker characteristics 118 can include speaker conditioning, noise conditioning, and style conditioning as described herein. Speaker conditioning can include the frequencies at which the speaker speaks. Noise conditioning can include ambient noise and background noise to the audio of the source speech waveform. Style conditioning can include changes to the voice, speaking speed, cadence, and the like due to emotion or tone of the speaker. Generation of speaker characteristics is described more below in relation to FIG. 3.

The training system can also include an audio encoder 106. The audio encoder 106 can be a machine learning system that determines the important parts of an audio representation 104 and uses that to generate an encoded representation that can be decoded into a useful output. The audio representation 104 can be any combination of a frequency-domain, time-domain, or frequency-domain and time-domain representation of the speech waveform. The audio representation 104 can be any type of representation of the audio. In some implementations, the audio encoder 106 can be referred to as a spectrogram posterior encoder. An audio encoder 106 can receive the audio representation 104 and the speaker characteristics 118 as inputs. In some implementations, the speaker conditioning, frame-level style conditioning, and frame-level noise conditioning are concatenated (for example, by concatenating vectors) together as the speaker characteristics 118 input to the audio encoder 106. The output of the audio encoder 106 is an encoded audio representation 108. The encoded audio representation 108 can be a machine learning representation of the important information from the audio representation 104. In some implementations, the encoded audio representation 108 is a latent representation. In some implementations, the encoded audio representation 108 can be referred to as a posterior distribution. The audio encoder 106 can be trained by comparing the encoded audio representation 108 to differences of the flow-normalized representation 122 and the frame-level representation 146 as described herein. The audio encoder 106 can be additionally or alternatively trained on differences between the generated speech waveform 114 and the speech waveform 102.

The encoded audio representation 108 can then be sampled to create a sampled encoded audio representation 110. In some implementations, the encoded audio representation 108 is not a digital file and needs to be sampled in order to create a digital file for future transformations, comparisons, and processing. In some implementations, the sampled encoded audio representation 110 can be referred to as a sampled posterior latent. In some implementations, the sampled encoded audio representation 110 is a latent representation.

Another input to the system for training the voice conversion system is message content 130 that corresponds to the one or more words of the speech waveform 102. Message content 130 can be any representation of the message (the words and/or sounds of a speech waveform without speaker characteristics) of the speech waveform 102. Message content 130 can be words, phonemes, probabilistic representations of possible phonemes, probabilistic representations of words, or any other way in which words and sounds can be dissected, categorized, and/or represented. For example, if the speech waveform was of an actor speaking the words "My name is Anigo Montoya. You killed my father. Prepare to die," then the message content 130 could be the text of those words or a phoneme sequence representing the text of those words. Additionally, the message content 130 could be a probabilistic representation of possible phonemes for each of the words in the example phrase. As described herein, the message content 130 can be processed to create a representation of a waveform without speaker or style characteristics that can be used to train the invertible normalizing flow module 120 and audio encoder 106.

One implementation of message content 130 involves the processing of text into phoneme sequences. In some implementations, text corresponding to the speech waveform can be input for training the voice conversion system. The text can be converted to a phoneme sequence using a grapheme-to-phoneme translator. Phonemes are the building blocks of the sounds of speech. Another way to think of phonemes is that phonemes are symbols of the smallest fundamental sounds that humans can produce. The phoneme sequence represents a textual version of the actual sounds made in the text and ultimately the speech waveform 102. The use of the text and the phoneme sequence can enable the generation of a frame-level representation 146 which can enable training of the audio encoder 106, waveform decoder 112 and the invertible normalizing flow module 120 on the fundamentals of human sounds. By training the audio encoder 106, waveform decoder 112 and the invertible normalizing flow module 120 on the fundamentals of human sounds, these machine learning systems can more precisely detect, understand, and utilize proper human sounds when generating speech waveforms. Nonetheless, as described herein, other types of message content 130 can be used to represent the message of the speech waveform 102.

The training system can also include a content encoder 138. A content encoder 138 receives message content 130 and language conditioning 136 to create a content representation. The content encoder 138 can be a machine learning system that determines the important parts of the message content 130 by using the language conditioning 136. The content encoder 138 can use the important parts of the message content 130 to generate an encoded representation (for example, a content representation) that can be decoded into a useful output. In some implementations, the content encoder can include a transformer machine-learning module. In some implementations, the content encoder 138 can be referred to as a content prior encoder. In some implementations, the content encoder 138 can include a transformer encoder used for natural language processing. The language conditioning 136 indicates which language corresponds to the message content 130. For example, the language conditioning 136 can indicate that the message content 130 is in English, Japanese, or any other language. The content encoder 138 can also receive speaker-independent context information 132 that is related to the style and noise conditioning of the speaker characteristics 118, but the speaker conditioning (for example, voice-specific characteristics) may be absent. The speaker-independent context information 132 can be obtained from the invertible normalizing flow module 120. The speaker-independent context information 132 can be included to increase the modeling capability of the content encoder 138 related to the content. For example, same sentence can be uttered with different expressions and in different environmental settings, which may point to different distribution location in the encoding.

The content representation can be upsampled at 142 and durations 140 are added to the content representation to generate a frame-level content representation. The durations and upsampling add timing information to the content representation such that the appropriate parts of the content representation match timing with the encoded audio representation 108. In some implementations, the durations 140 can be extracted from the speech waveform 102. The durations and upsampling enable frames of the content representation to matchup with the proper frames of the audio representation 104 and associated sampled encoded audio representation 110. For example, the speech waveform 102 may be of a sentence "with great power comes great responsibility." The speaker may emphasize the second "great" by saying it more slowly such as saying "great" over 10 frames. As such, the content representation of the second "great" should be upsampled and given sufficient frames, 10 frames, to match the number of frames for the second "great" in the sampled encoded audio representation 110.

In some implementations, the durations 140 can be generated by a duration predictor. The duration predictor can be a trained model for determining the duration of any type of message content. For example, the duration predictor can determine the duration of each phoneme. In some implementations, the mean speaker conditioning and global style conditioning can be summed together as inputs to the duration predictor.

The training system can also include a frame-level encoder 144. The frame-level encoder 144 can be a machine learning system that determines the important parts of the frame-level content representation and uses that to generate an encoded representation that can be decoded into a useful output. The frame-level encoder 144 can receive the frame-level content representation. In some implementations, the frame-level encoder 144 can be referred to as a frame-level prior encoder. The output of the frame-level encoder 144 is a frame-level representation 146. The frame-level representation 146 can be considered a representation of the speech waveform 102 without parts or all of the speaker characteristics 118. For example, the frame-level representation 146 does not have any or most of the information regarding the speaker conditioning of the speech waveform 102. In some implementations, the frame-level representation can have durational components related to phonemes. The frame-level representation 146 may have information regarding the style and noise conditioning of the speech waveform 102 that is speaker normalized, to increase the modeling capability related to different expressivity and environmental settings. The style and noise conditioning may be derived from the speaker-independent context 132 as described herein. In some implementations, the frame-level representation 146 can be referred to as a prior distribution.

The training system can also include an invertible normalizing flow module 120. The invertible normalizing flow module 120 can be a machine learning system that can both extract the speaker characteristics out of a representation of a speech waveform as well as add in new speaker characteristics into a speech waveform. The invertible normalizing flow module 120 can receive the sampled encoded audio representation 110 and the speaker characteristics 118 as inputs to generate a flow-normalized representation 122. In some implementations, the speaker conditioning and mean speaker conditioning can be randomized for training the invertible normalizing flow module 120, the randomized speaker conditioning can then be concatenated with global style conditioning, and global noise conditioning as the speaker characteristics 118 input to the invertible normalizing flow module 120. Randomizing the speaker conditioning and mean speaker conditioning trains the invertible normalizing flow module 120 to be able to do forward flow and reverse flow during inference (as described below in FIG. 2). The flow-normalized representation 122 can be a representation of a speech waveform where the speaker characteristics 118 are extracted from the sampled encoded audio representation 110. In some implementations, the flow-normalized representation 122 can be a representation of the speech waveform devoid of speaker characteristics. In some implementations, the flow-normalized representation 122 can be a latent representation. The invertible normalizing flow module 120 can reduce the richness of the speaker characteristics 118 in the sampled encoded audio representation 110. In some implementations, the invertible normalizing flow module 120 can be trained on the KL-divergence 124 (Kullback-Leibler divergence) as described herein.

KL-divergence 124 can be used to measure the distance between multiple distributions and/or representations, such as the encoded audio representation 108, the flow-normalized representation 122, and the frame-level representation 146, and any derivatives of these representations. Derivatives of these representations can be when any of these representations have additional operations or transformations applied to them. In this way, the KL-divergence 124 can be used to see how distant a target distribution and a reference distribution are. The training is meant to minimize the KL-divergence 124 so that the voice conversion system is well-modeled for converting source speech waveforms with source speaker characteristics into target speech waveforms with target speaker characteristics. In some implementations, the KL-divergence is computed between the encoded audio representation 108 and a transformed frame-level representation based on the frame-level representation 146. The transformed frame-level representation can be generated based on the frame-level representation and the reverse flow of the invertible normalizing flow module 120. In some implementations, the frame-level representation 146 can be evaluated with the flow-normalizing representation 122 to generate an evaluated frame-level representation. In some implementations, the evaluated frame-level representation can be multiplied (for example, vector multiplication) by the Jacobian determinant of the invertible normalizing flow module 120 to generate the transformed frame-level representation. If the KL-divergence indicates a distance of zero, then the encoded audio representation 108 can be perfectly reconstructed from the frame-level representation 146. A distance of zero is indicative that the frame-level representation 146, the flow-normalized representation 122, the invertible normalizing flow module 120, and the encoded audio representation 108 are well-modeled. In some implementations, the KL-divergence is computed between the flow-normalized representation 122 and the frame-level representation 146.

The training system can also include a waveform decoder 112. The waveform decoder 112 is designed to receive encoded representations and generate speech waveforms. As described herein, encoded representations (and other representations) may not be otherwise useable. The waveform decoder 112 decodes the representations to generate waveforms that are useful outputs. The waveform decoder 112 can receive the sampled encoded audio representation 110 and the speaker characteristics 118 as inputs to generate a generated speech waveform 114. In some implementations, the mean speaker conditioning, global style conditioning, and global noise conditioning can be summed (for example, using vector addition) together the speaker characteristics 118 input to the waveform decider 112. The generated speech waveform 114 may have some information lost due to the encoding process of a different system (for example the audio encoder 106 or the invertible normalizing flow module 120) and thus not represent a properly constructed and useable speech waveform. The generated speech waveform 114 can be generated to include the same non-verbal components of the speech waveform 102. Non-verbal components of the speech waveform 102 (which can be included in the generated speech waveform 114) include pauses, silences, fluency of the words, inflection, and the like.

The generated speech waveform 114 can undergo processes to compute the reconstruction and adversarial losses with respect to speech waveform 102. Reconstruction losses and adversarial losses can enable the generated speech waveform 114 to be high-fidelity and as close as possible to the original speech waveform 102. Reconstruction losses can be computed by generating an audio representation of the generated speech waveform 114 that is analogous to the audio representation 104 generated from the speech waveform 102. For example, if the audio representation 104 of speech waveform 102 is a linear spectrogram, then a linear spectrogram can be generated from the generated waveform 114. Reconstruction losses can then be computed between the audio representation of the generated speech waveform 114 and the audio representation 104. The reconstruction losses can be used to obtain consistent frequency components in the generated speech waveform 114. In other implementations, waveform decoder 212 may be optimized with different types of losses other than reconstruction and adversarial losses, but still correspond to the optimization of a waveform signal.

Adversarial losses enable the generation of real-sounding speech by capturing characteristics that cannot be captured by comparing the difference in frequency components as described above in relation to reconstruction losses. Adversarial losses can be important because the resolution of a speech waveform can be much higher than frame-rate frequency components which are used in the any of or any combination of the audio representation 104, the encoded audio representation 108, and the sampled encoded audio representation 110. Adversarial losses are computed by inputting the generated speech waveform 114 into a discriminator module. The discriminator module can be a machine-learning module. The discriminator module can be designed to discern real speech waveforms (for example, the speech waveform 102) from generated speech waveforms (for example, generated speech waveform 114). In this way, waveform decoder 212 can endeavor repeatedly to create a generated speech waveform 114 that can fool the discriminator module. By pitting the waveform decoder 212, which is trying to generate a generated speech waveform 114 that is indistinguishable from a real speech waveform, against the discriminator module, which tries to discern whether a speech waveform is real or generated, the waveform decoder 212 can be trained and learn to generate a generated speech waveform 114 that is very similar to a real speech waveform such as the speech waveform 102.

Figure 2:
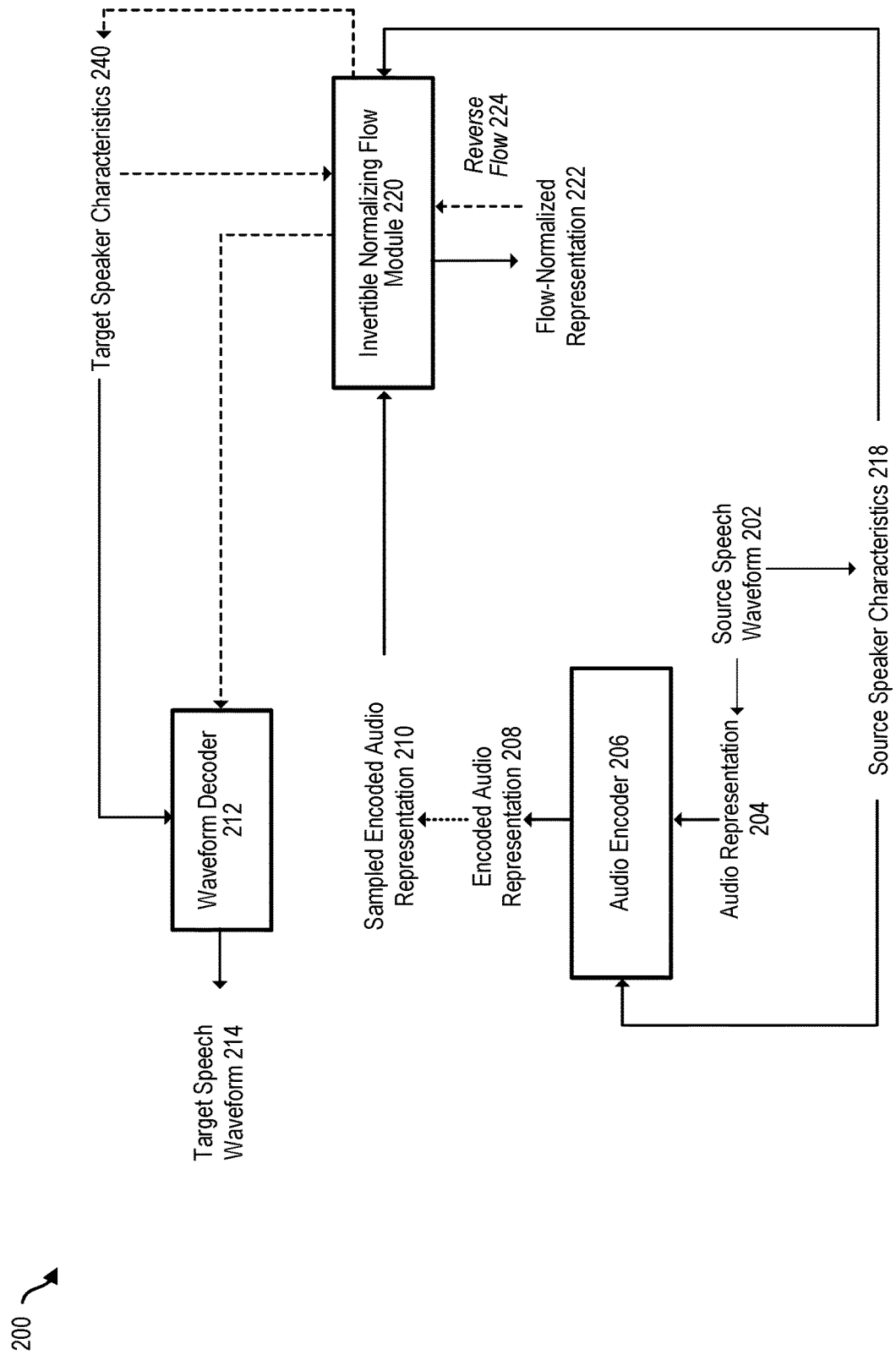
FIG. 2 illustrates an example system for converting a source speech waveform of a source speaker to a target speech waveform of a target speaker, according to an embodiment of the present disclosure.

FIG. 2 illustrates an example block diagram 200 of a voice conversion system. The voice conversion system enables high fidelity voice conversion of a source speech waveform 202 as described herein. A user can choose a target speaker such that the target speech waveform 214 will be generated with the target speaker speaking the one or more words of the source speech waveform 202 using the voice of the target speaker. In some implementations, target speakers can be specific speakers that the training system (described in relation to FIG. 1) had trained on. For example, the training system may have trained on 1000 or more speech waveforms for each specific target speaker. In some implementations, target speakers can be combinations of speakers that the training system had trained on. For example, the training system could have trained on speaker A, speaker B, and speaker C and the target speaker could be a combination of 20% speaker A, 50% speaker B, and 30% speaker C. The generation of a target speech waveform 214 from a source speech waveform 202 and a selected target speaker by the voice conversion system can be referred to as inference.

One of the inputs to the voice conversion system is a source speech waveform 202 of one or more words. The one or more words can be a phrase, sentence, or set of sentences. The speech waveform 102 can be associated with a speaker. The speaker can be any kind of human, non-human, computer-generated, or other type of speaker.

The speech waveform 202 can be used to generate an audio representation 204. An example audio representation can be a linear spectrogram that indicates the frequencies of sound in the speech waveform 202 frame-by-frame. In some implementations, the audio representation 204 can be a lower resolution or lower fidelity than the source speech waveform 202. For example, the source speech waveform could be a lossless or nearly lossless digital representation of the one or more words spoken by the speaker. The corresponding audio representation could be a more lossy digital representation of the source speech waveform by having, for example, a lower bitrate or fewer bits for resolution of frequencies. The audio representation can be divided into frames, where each frame represents the frequencies of sound and associated amplitudes in the speech waveform during a certain time duration. In some implementations, these frames can be 12 milliseconds long.

The speech waveform 202 can also be used to generate source speaker characteristics 218. Source speaker characteristics 218 can include source speaker conditioning, source noise conditioning, and source style conditioning as described herein. Speaker conditioning can include the frequencies at which the speaker speaks. Noise conditioning can include ambient noise and background noise to the audio of the source speech waveform. Style conditioning can include changes to the voice, speaking speed, cadence, and the like due to emotion or tone of the speaker. Generation of speaker characteristics, such as source speaker characteristics, is described more below in relation to FIG. 3.

Another input to the voice conversion system is the target speaker characteristics 240. A user of the voice conversion system can select the target speaker for the target speech waveform 214. For example, if the voice conversion system has target speaker options including a famous politician and the user chooses the famous politician as the target speaker, then the target speech waveform 214 will be the words of the source speech waveform 202 in the voice of the famous politician. The target speech waveform 214 can be generated to include the same non-verbal components of the source speech waveform 202. Non-verbal components of the source speech waveform 202 (which can be included in the target speech waveform 214) include pauses, silences, fluency of the words, inflection, and the like. Target speaker characteristics 240 can include target speaker conditioning, target noise conditioning, and target style conditioning. In some implementations, the target noise and target style conditioning can be obtained through the reverse flow 224 of the invertible normalizing flow module 220, such that the source noise and style conditioning can be converted into the target noise and style conditioning, if so desired, by using the target speaker conditioning. Target speaker characteristics 240 can represent speaker characteristics that the voice conversion system was trained on (for example, the speaker characteristics 118 of FIG. 1).

The voice conversion system can also include an audio encoder 206. The audio encoder 206 can be trained by the training system (for example, the audio encoder 206 can be the audio encoder 106 of FIG. 1 that was trained). The audio encoder 206 can be a machine learning system that determines the important parts of an audio representation and uses that to generate an encoded representation that can be decoded into a useful output. In some implementations, the audio encoder 206 can be referred to as a spectrogram posterior encoder. The audio encoder 206 can receive the audio representation 204 and the source speaker characteristics 218 as inputs. The audio encoder 206 can output an encoded audio representation 208.

The encoded audio representation 208 can then be sampled to create a sampled encoded audio representation 210. In some implementations, the encoded audio representation 208 is not a digital file and needs to be sampled in order to create a digital file for future transformations, comparisons, and processing. In some implementations, the sampled encoded audio representation 210 can be referred to as a sampled posterior latent.

The voice conversion system can also include an invertible normalizing flow module 220. The invertible normalizing flow module 220 can be trained by the training system (for example, the invertible normalizing flow module 220 can be the invertible normalizing flow module 120 of FIG. 1 that was trained). The invertible normalizing flow module 220 can be a machine learning system that can both extract the speaker characteristics out of a representation of a speech waveform (for example, the sampled encoded audio representation 210) as well as add in new speaker characteristics (for example, the target speaker characteristics 240) into a speech waveform or a representation of the speech waveform. The invertible normalizing flow module 220 can receive the sampled encoded audio representation 210 and the source speaker characteristics 218 to generate a flow-normalized representation 222. The flow normalized representation 222 can be a normalized version of the sampled encoded audio representation 210 such that the source speaker characteristics 218 are extracted out. This process of generating a flow-normalized representation 222 can be referred to as forward flow.

The invertible normalizing flow module 220 can receive the flow-normalized representation 222 and the target speaker characteristics 240 to generate a target speech representation. The target speech representation includes the target speaker characteristics 240 entangled into the flow-normalized representation 222. This entanglement of the target speaker characteristics 240 into the flow-normalized representation 222 can be referred to as reverse flow. By using the invertible normalizing flow module 220 to entangle the target speaker characteristics 240 into the flow-normalized representation 222, the expressivity and the randomness of the speaking manner of the target speaker can be preserved in the target speech waveform 214.

The voice conversion system can also include a waveform decoder 212. The waveform decoder 212 is designed to receive encoded representations and generate speech waveforms. The waveform decoder 212 can be trained by the training system (for example, the waveform decoder 212 can be the waveform decoder 112 of FIG. 1 that was trained). As described herein, encoded representations (and other representations) may not be otherwise useable. The waveform decoder 212 decodes the representations to generate waveforms that are useful outputs. The waveform decoder 212 can receive the target speech representation and the target speaker characteristics 240 in order to generate a target speech waveform 214. In some implementations, the target speech waveform 214 can be referred to as a converted speech waveform because the speech waveform has been converted from the source speaker to the target speaker.

Figure 3:
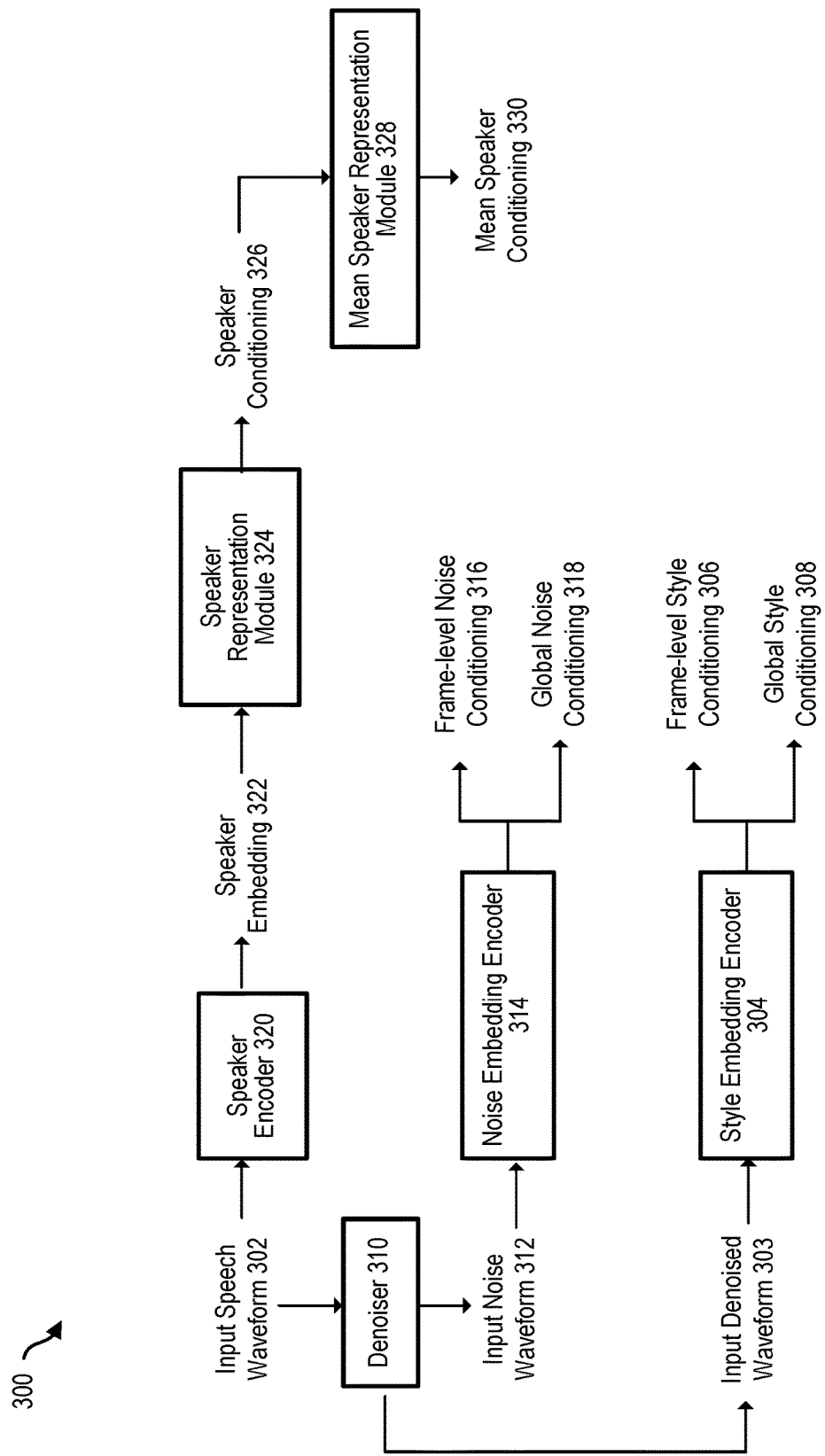
FIG. 3 illustrates a block diagram of a system for extracting speaker characteristics, according to an embodiment of the present disclosure

FIG. 3 illustrates an example block diagram 300 for generating speaker characteristics from an input speech waveform 302. For example, the speaker characteristics 118 of FIG. 1 can be generated from the speech waveform 102 and the source speaker characteristics 218 of FIG. 2 can be generated from the source speech waveform 202. The target speaker characteristics 240 of FIG. 2 can be generated from a single target speech waveform or can be a collation of multiple speech waveforms from the target speaker. As noted above, speaker characteristics include speaker conditioning, noise conditioning, and style conditioning.

Style conditioning is a speaker characteristic that can be extracted from an input speech waveform 302. Style conditioning is used for variations of tone, emotion, and different ways in which the speaker speaks. For example, style conditioning can be when the speaker is using different style variations such as happy, sad, excited, yelling, and many others. Style conditioning can include frame-level style conditioning 306 and global style conditioning 308. Frame-level style conditioning refers to the style of one or more frames of the input speech waveform 302. For example, an input speech waveform could compose three sentences. The first two sentences could be excited while the last sentence is dejected. Here, the frame-level style conditioning 306 of the first two sentences would be different from the frame-level style conditioning of the third sentence. Global style conditioning 308 refers to style conditioning for the entire input speech waveform. For example, the input speech waveform could be a famous snippet of a monologue in a movie where the monologue is spoken contemplatively. Here, the global style conditioning for the input speech waveform could be contemplative.

Noise conditioning is a speaker characteristic that can be extracted from an input speech waveform 302. Noise conditioning can be important to ensure that the flow of the noise information (for example, the noise characteristics of the training data) does not affect the modelling of the voice characteristics represented by the speaker conditioning 326. Noise conditioning can be important to extract to ensure that target speech waveforms (for example, target speech waveform 214 of FIG. 2) do not include ambient noise characteristics from the source speech waveforms used in the training system to train the voice conversion system (for example, the speech waveform 102 of FIG. 1). Noise conditioning can include frame-level noise conditioning 316 and global noise conditioning 318. Frame-level noise conditioning 316 refers to the noise of one or more frames of the input speech waveform 302. For example, an input speech waveform could compose four sentences. The first two sentences could have a siren in the background. Here, the frame-level noise conditioning of the first two sentences would be different from the frame-level noise conditioning of the last two sentences. Global noise conditioning 318 refers to style conditioning for the entire input speech waveform. For example, the input speech waveform could have noises from an HVAC system. Here, the global noise conditioning for the input speech waveform could be the noises from the HVAC system.

A denoiser 310 can be part of a system for generating speaker characteristics from an input speech waveform 302, specifically noise conditioning. A denoiser 310 can receive the input speech waveform 302 to generate an input noise waveform 312. The denoiser 310 can isolate the noise in the input speech waveform 302. The input noise waveform 312 can represent ambient noise in the input speech waveform 302. For example, if there is noise from fans or other ambient noise, or if there is an echo in the input speech waveform. A denoiser 310 can also generate an input denoised waveform 303, from the input speech waveform 302, that is free from noise/residual signal. The input denoised waveform 303 can be used for the encoding of style conditioning that is not affected by and/or invariant of environmental and/or ambient noise.

A style embedding encoder 304 can be part of a system for generating speaker characteristics from an input speech waveform 302, specifically style conditioning. In some implementations, the style embedding encoder 304 can receive the input speech waveform 302 to generate frame-level style conditioning 306 and global style conditioning 308. In some implementations, as seen in FIG. 3, the style embedding encoder 304 can receive the input denoised waveform 303 that is extracted from an input speech waveform 302. This allows the style conditioning that is not affected by the environmental and/or ambient noise, rather focusing on the trend and/or pattern of the speech expressivity and/or style of the input speech waveform 302.

A noise embedding encoder 314 can also be part of a system for generating speaker characteristics from an input speech waveform 302, specifically noise conditioning. A noise embedding encoder 314 can receive the input noise waveform 312 to generate frame-level noise conditioning 316 and global noise conditioning 318.

A speaker encoder 320 can be part of a system for generating speaker characteristics from an input speech waveform 302, specifically speaker conditioning. A speaker encoder 320 can receive the input speech waveform 302 to generate a speaker embedding 322. The speaker encoder 320 can be a machine learning system. For example, the speaker encoder 320 can be a neural network. Speaker embedding 322 represents the vocal characteristics and/or vocal tract of the speaker.

A speaker representation module 324 can also be part of a system for generating speaker characteristics from an input speech waveform 302, specifically speaker conditioning. Speaker embedding 322 can be an input to a speaker representation module 324. The speaker representation module can identify the underlying speaker attributes, such as age, gender, voice harshness, and other speaker attributes. The speaker representation module 326 enables the voice conversion system to learn various underlying speaker attributes to better support the use of any speaker as a source speaker for a source speech waveform and generating a target speaker (for example, generating within the voice conversion system or the training system itself) for a target speech waveform. The speaker representation module 326 can also enable the approximation of speaker conditioning during inference through the combinations of the available underlying speaker attributes that are optimized for use by the voice conversion system, instead of only relying on the raw extracted speaker embedding. The speaker representation module 324 generates speaker conditioning 326. The speaker conditioning 326 is associated with the input speech waveform 302.

The speaker conditioning 326 can be processed by a mean speaker representation module 328 to generate mean speaker conditioning 330. The mean speaker conditioning 330 can be representative of all input speech waveforms of the same speaker.

Figure 4:
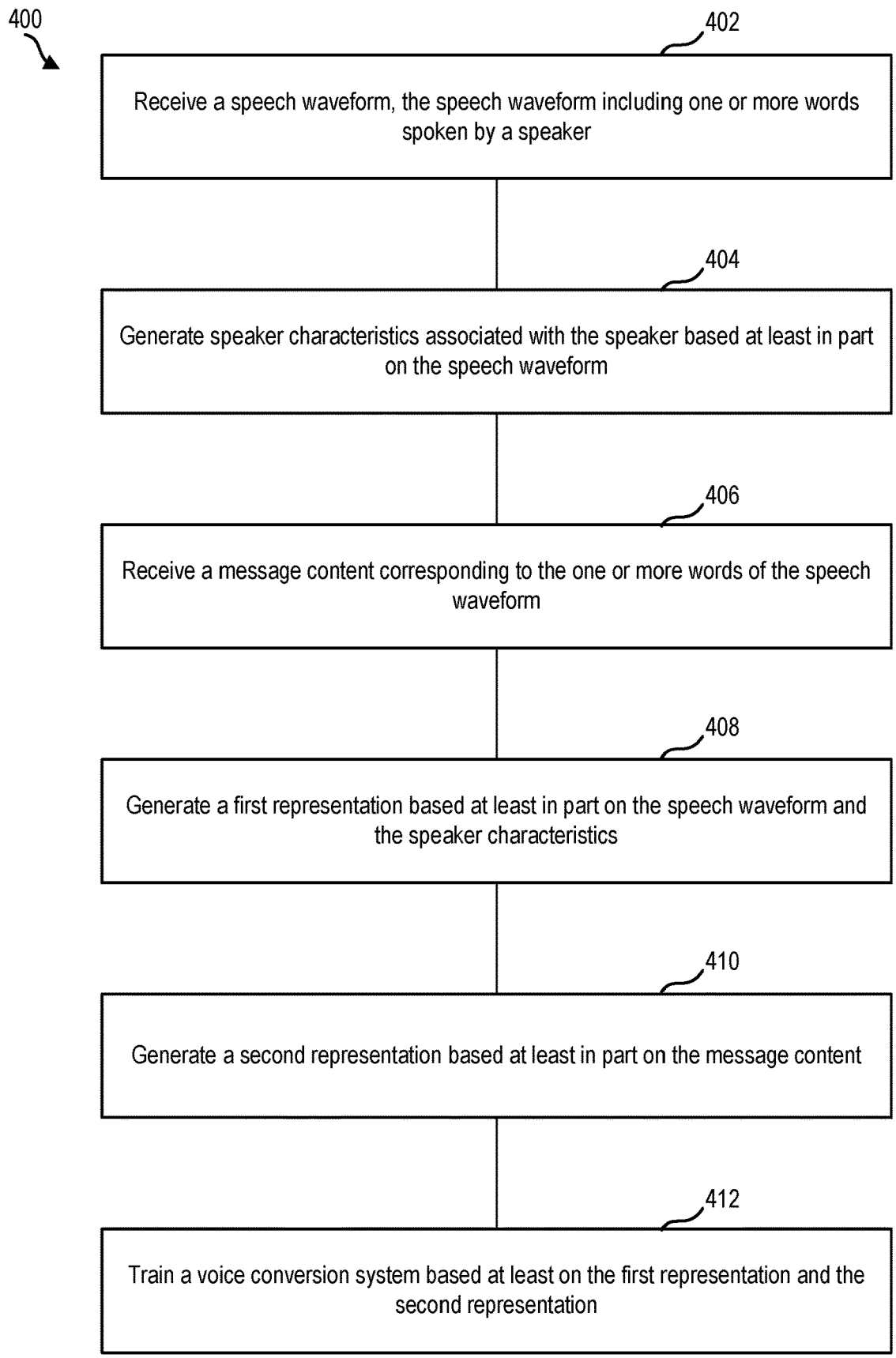
FIG. 4 illustrates a flow diagram for training a voice conversion system, according to an embodiment of the present disclosure.

FIG. 4 illustrates an example process 400 for training a voice conversion system, in accordance with one or more embodiments. Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 402, a computer system (for example, the training system of FIG. 1 and/or the voice conversion system of FIG. 2) can receive a speech waveform. The speech waveform can include one or more words spoken by a speaker.

At block 404, the computer system can generate speaker characteristics associated with the speaker based at least in part on the speech waveform. As described in further detail in reference to the above figures, speaker characteristics can include speaker conditioning, noise conditioning, and style conditioning.

At block 406, the computer system can receive a message content corresponding to the one or more words of the speech waveform. As described in reference to FIG. 1, a message content can be a text file, sequence of one or more words, sequence of one or more phonemes, sequence of probabilistic representation of one or more words, or sequence of probabilistic representation of one or more phonemes.

At block 408, the computer system can generate a first representation based at least in part on the speech waveform and the speaker characteristics. With reference to FIG. 1, the first representation can be the encoded audio representation 108 or the sampled encoded audio representation 110. In some implementations, the computer system can normalize the first representation based at least in part on the speaker characteristics.

At block 410, a computer system (for example, the training system of FIG. 1 and/or the voice conversion system of FIG. 2) can generate a second representation based at least in part on the message content. With reference to FIG. 1, the second representation can be the content representation or the frame-level content representation. As described in further detail in reference to the above figures, in some implementations, generating the second representation can be based at least in part on an upsampled phoneme sequence. In some implementations, generating the upsampled phoneme sequence can be a phoneme sequence and durations associated with each phoneme of the phoneme sequence. In some implementations, generating the phoneme sequence can be based on a text file and/or sequence of one or more words being the message content.

At block 412, a computer system (for example, the training system of FIG. 1 and/or the voice conversion system of FIG. 2) can train a voice conversion system based at least on the first representation and the second representation. As described in further detail in reference to the above figures, training the voice conversion system can include training an audio encoder, a waveform decoder, and a normalizing flow module.

In some implementations, the computer system can also generate a created speaker based at least in part on the speaker characteristics and one or more other speaker characteristics. A created speaker is a speaker that does not represent the voice of an actual person, for example, an actor or famous voice. Instead, the created speaker represents a voice that was created through audio engineering or the combination of multiple voices, and other similar techniques. The created speaker can be selectable as a target speaker selection.

Figure 5:
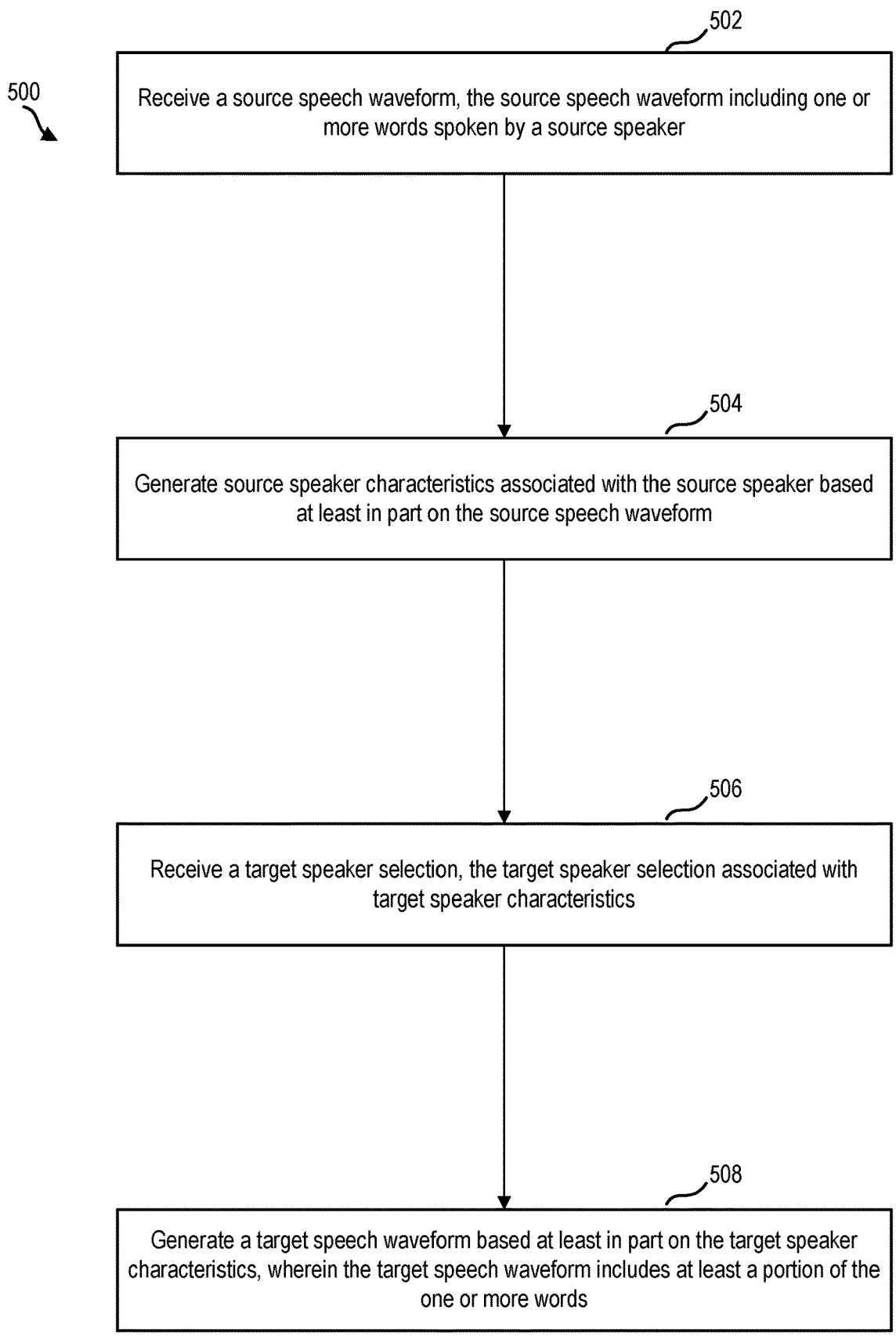
FIG. 5 illustrates a flow diagram for converting a source speech waveform of a source speaker to a target speech waveform of a target speaker, according to an embodiment of the present disclosure.

FIG. 5 illustrates an example process 500 for converting a source speech waveform of one or more words of a source speaker into a target speech waveform of one or more words of a target speaker, in accordance with one or more embodiments. Some or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 502, a computer system (for example, the training system of FIG. 1 and/or the voice conversion system of FIG. 2) can receive a source speech waveform. The source speech waveform can include one or more words spoken by a source speaker.

At block 504, the computer system can generate source speaker characteristics associated with the source speaker based at least in part on the source speech waveform. As described in further detail in reference to the above figures, speaker characteristics can include speaker conditioning, noise conditioning, and style conditioning. The speaker conditioning can include frequencies of the voice of the source speaker. Speaker conditioning can include mean speaker conditioning as described in reference to FIG. 3. Mean speaker conditioning can be a collation of speaker conditioning from two or more speech waveforms from a single speaker. Noise conditioning can include ambient noise. Style conditioning can include tone or emotion of the speaker.

At block 506, the computer system can receive a target speaker selection. The selected target speaker can be a speaker identified by the training system during training of the voice conversion system. The selected target speaker can also be a famous speaker. The target speaker selection can be associated with target speaker characteristics.

At block 508, the computer system can generate a target speech waveform based at least in part on the target speaker characteristics. The target speech waveform can include at least a portion of the one or more words. In some implementations, the target speech waveform can be in a different language from the target speaker's native language. For example, the target speaker only speaks English and/or the speech waveforms of the target speaker used to train the voice conversion system (as described herein in relation to FIG. 1) are speech waveforms of English. However, if the source speech waveform is German, then the target speech waveform will also be in German but in the voice of the target speaker (who, in this example, does not speak German and/or the speech waveforms of the target speaker used to train the voice conversion system are not German).

In some implementations, generating a target speech waveform can include generating a normalized representation of the source speech waveform based at least in part on the source speech waveform and the source speaker characteristics. The normalized representation of the source speech waveform can be flow-normalized representation 222 of FIG. 2. As described in further detail in relation to FIG. 2, the normalized representation can be generated by the invertible normalizing flow module 220 of FIG. 2 based on the input of the sampled encoded audio representation 210.

In some implementations, generating a target speech waveform can include generating a target representation of the target speech waveform based at least in part on the normalized representation and the target speaker characteristics. The target representation of the target speech waveform can be the target speech representation as described herein in reference to FIG. 2. As described in further detail in relation to FIG. 2, the target representation can be generated by the invertible normalizing flow module 220 of FIG. 2 via reverse flow.

Figure 6:
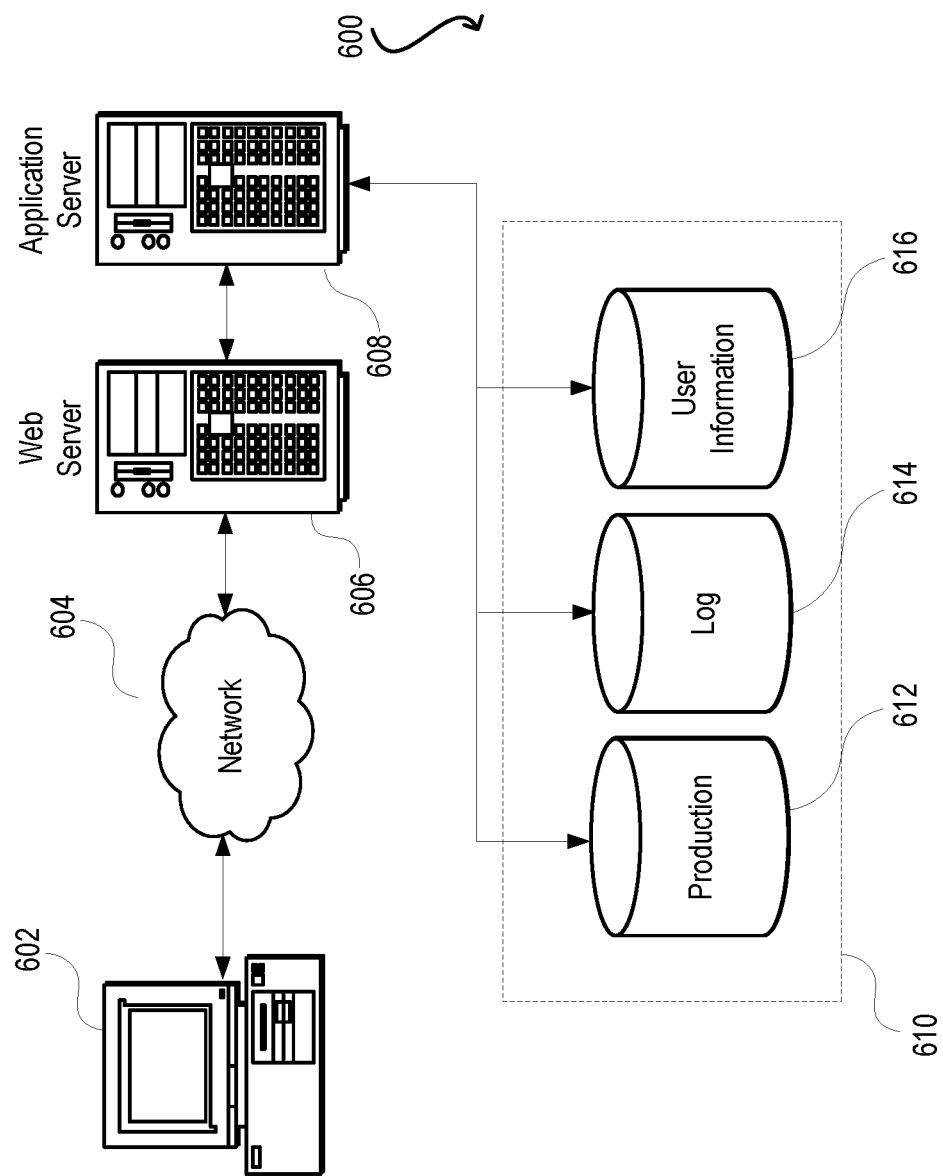
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as JavaR, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a source speech waveform, the source speech waveform including one or more words spoken by a source speaker;
generating source speaker characteristics associated with the source speaker based at least in part on the source speech waveform, wherein the source speaker characteristics comprise first speaker conditioning, first noise conditioning, and first style conditioning;
receiving a target speaker selection, the target speaker selection associated with target speaker characteristics, wherein the target speaker characteristics comprise second speaker conditioning, second noise conditioning, and second style conditioning; and
generating a target speech waveform based at least in part on the target speaker characteristics, wherein the target speech waveform includes at least a portion of the one or more words.

2. The computer-implemented method of claim 1, further comprising:
generating a phoneme sequence based at least in part on the one or more words;
generating an upsampled phoneme sequence based on the phoneme sequence and durations associated with each phoneme of the phoneme sequence; and
wherein, the target speech waveform is further generated based at least in part on the upsampled phoneme sequence.

3. The computer-implemented method of claim 1, further comprising:
generating a created speaker based at least in part on the source speaker characteristics and one or more other speaker characteristics; and
wherein the created speaker is selectable as a target speaker selection.

4. One or more non-transitory computer-readable medium comprising computer-executable instructions that, when executed by one or more processors, cause the one or more processors to perform operations comprising:
receiving a source speech waveform, the source speech waveform including one or more words spoken by a source speaker;
generating source speaker characteristics associated with the source speaker based at least in part on the source speech waveform, wherein the source speaker characteristics comprise first speaker conditioning, first noise conditioning, and first style conditioning;
receiving a target speaker selection, the target speaker selection associated with target speaker characteristics, wherein the target speaker characteristics comprise second speaker conditioning, second noise conditioning, and second style conditioning; and
generating a target speech waveform based at least in part on the target speaker characteristics, wherein the target speech waveform includes at least a portion of the one or more words.

5. The one or more non-transitory computer-readable medium of claim 4, wherein first speaker conditioning includes frequencies of a voice of the source speaker.

6. The one or more non-transitory computer-readable medium of claim 4, wherein first speaker conditioning includes mean speaker conditioning, wherein mean speaker conditioning is a collation of speaker conditioning from two or more speech waveforms from a single speaker.

7. The one or more non-transitory computer-readable medium of claim 4, wherein first noise conditioning includes ambient noise.

8. The one or more non-transitory computer-readable medium of claim 4, wherein second style conditioning includes tone or emotion.

9. The one or more non-transitory computer-readable medium of claim 8, wherein second style conditioning includes frame level style conditioning.

10. The one or more non-transitory computer-readable medium of claim 8, wherein second style conditioning includes global style conditioning.

11. The one or more non-transitory computer-readable medium of claim 4, wherein generating the target speech waveform includes generating a normalized representation of the source speech waveform based at least in part on the source speech waveform and the source speaker characteristics.

12. The one or more non-transitory computer-readable medium of claim 11, wherein generating the target speech waveform includes generating a target representation of the target speech waveform based at least in part on the normalized representation and the target speaker characteristics.

13. The one or more non-transitory computer-readable medium of claim 4, wherein the target speech waveform is in a different language from a language associated with a target speaker associated with the target speaker selection.

14. A computer system comprising:
one or more processors; and
one or more memory storing instructions that, upon execution by the one or more processors, configure the computer system to:
receive a source speech waveform, the source speech waveform including one or more words spoken by a source speaker;
generate source speaker characteristics associated with the source speaker based at least in part on the source speech waveform, wherein the source speaker characteristics comprise first speaker conditioning, first noise conditioning, and first style conditioning;
receive a target speaker selection, the target speaker selection associated with target speaker characteristics, wherein the target speaker characteristics comprise second speaker conditioning, second noise conditioning, and second style conditioning; and
generate a target speech waveform based at least in part on the target speaker characteristics, wherein the target speech waveform includes at least a portion of the one or more words.

15. The computer system of claim 14, wherein generating the target speech waveform includes generating a normalized representation of the source speech waveform based at least in part on the source speech waveform and the source speaker characteristics.

16. The computer system of claim 15, wherein generating the target speech waveform includes generating a target representation of the target speech waveform based at least in part on the normalized representation and the target speaker characteristics.

17. The computer system of claim 14, wherein the target speech waveform is in a different language from a language associated with a target speaker associated with the target speaker selection.

18. The computer-implemented method of claim 1, wherein first style conditioning includes tone or emotion.

19. The computer-implemented method of claim 1, wherein first style conditioning includes frame level style conditioning.

20. The computer-implemented method of claim 1, wherein generating the target speech waveform includes generating a normalized representation of the source speech waveform based at least in part on the source speech waveform and the source speaker characteristics.

* * * * *